Patented May 12, 1942

2,282,603

UNITED STATES PATENT OFFICE 2,282,603

PROCESS FOR HYDROGENOLYSIS OF CRUDE SUGAR BEARING MATERIALS

Robert N. Du Puis, Chicago, Ill., assignor to Association of American Soap & Glycerine Producers, Inc., New York, N. Y., a corporation of Delaware No Drawing. Application July 21, 1938, Serial No. 220,497

14 Claims. (Cl. 260—635)

This invention resides in a process for the hydrogenolytic (i. e., simultaneous splitting of molecules with hydrogenation of the product) conversion of low purity crude sugars into alcohols of lower molecular weight, such as glycerol, glycols, and related substances, and resides in a novel combination of processing steps by which high yields of desired products are achieved. I have discovered that crude starting materials which have previously been thought to be inert to catalytic hydrogenolysis under pressure and temperature conditions feasibly maintainable, become reactive with respect to hydrogen under these same conditions if preliminarily subjected to certain preparatory steps which remove only a small part of the total impurities present. Crude starting materials have a poisoning effect upon many hydrogenation catalysts, but according to the discovery of this invention, such materials may, without removal of the great bulk of their impurities, nevertheless be successfully treated.

According to the present invention, as a preliminary step thereof the crude sugar may, in one embodiment, be treated in water solution with a soluble compound of a metal of the group comprising silver, mercurous mercury, cuprous copper, lead, or thallium, whereupon a precipitate is thrown down. For best results, sufficient of the precipitation compound is added to throw down all precipitate that will be formed in this way. An excess thereover, although not harmful in most cases, is uneconomical and should be avoided. The solids thus formed may then be separated from the solution in which they are formed by any method which will bring about their substantial removal, as by decantation, filtering, or the like. The solids thus removed may be treated for recovery of the metal contained therein, a matter of importance where the metal is of high value, as in the case of silver, thallium, or other metal of value.

For example, the reclamation of silver precipitates may be effected practically quantitatively by heating the silver precipitate with a strong alkali, whereby silver oxide is formed as an insoluble precipitate. This is filtered and washed and may then be simply converted to a desirable soluble salt for re-use by neutralization with an appropriate acid, such as acetic, sulfuric, or nitric acid.

Recovery of the silver may also be accomplished by strongly heating the precipitated silver with concentrated sulfuric acid. By this treatment the ions precipitated by the silver are released and a large part thereof evolved as hydrogen chloride. Silver sulfate remains behind with some sulfuric acid, which may be removed by further distillation and recovered if desired. Any residual acid may be neutralised, and the silver sulfate may be removed as the solid or by solution in water. The silver precipitate from an impure sugar solution probably also contains organic material, but such will be destroyed by the sulfuric acid during the above treatment, possibly with the deposition of a residue of carbon. No harm will result if this carbon residue is recycled with the reformed silver sulfate, but if its removal is desired, it may be filtered from the water solution obtained by leaching the silver sulfate.

The preliminary step of the process of this invention may be referred to as a dechlorinating step, but the action of the precipitating metal in ridding the crude sugar in water media of certain impurities adversely affecting catalytic hydrogenolysis is not completely understood. It has been found, however, that the step of adding a soluble compound of one or more metals of the group comprising silver, mercurous mercury, cuprous copper, lead, or thallium, among other things removes chloride ion and has the desired effect. Compounds falling within the group above defined are termed "dechlorinating precipitation compounds" herein. While much of the precipitate formed by the dechlorinating precipitation compounds is composed of chlorides (and chlorine ion seems to be detrimental to the hydrogenolysis reaction), other detrimental impurities appear also to be diminished by the action of the dechlorinating precipitation compounds.

As an equivalent of the aforementioned step, the crude sugar, after dispersal in water, instead of being treated with a dechlorinating precipitation compound may be brought into contact with a synthetic dechlorinating resin formed, for example, by interaction of aniline or m-phenylene diamine and formaldehyde. This is best accomplished by passing the crude sugar-water dispersion through a loose bed of small fragments of the solid dechlorinating resin. By adsorption, chloride ion and other impurities now unknown but apparently associated with chloride ion are removed on the surface of the dechlorinating resin. The resin bed may, upon exhaustion, be regenerated by treatment with an alkaline solution and finally washed with water.

An equivalent procedure by which chloride or associated impurities may be removed as a preliminary step in the treatment of crude sugars in accordance with this invention, is by acid oxidation thereof. As an instance thereof, the crude sugar mixed with water is slightly acidulated by the addition of a non-chloride non-volatile acid, such as sulfuric or phosphoric acid. The acidulated crude sugar solution is then subjected to intensive aeration, as by blowing air therethrough or by scrubbing, whereupon chlorine is removed to a large extent as elemental chlorine and as hydrogen chloride in company with other impurities.

The two latter methods of preliminarily treating the crude sugar for removal of chloride and related impurities have the advantage of delivering the treated sugar solution free of any added solids, while treatment with dechlorinating precipitation compounds must be followed by steps removing the precipitate. Any of these agents for removal of chloride are referred to herein as dechlorinating agents.

Following or preceding any of the above steps, the crude sugar solution so treated may be subjected to additional preliminary treatment with an agent capable of adsorbing complex organic impurities. The crude sugar solution either before or after dechlorination, or as a part of the step of removal of precipitated solids by filtration, may be treated by contacting the crude sugar solution with a solid adsorption agent, such as activated carbon, activated alumina, gelatinous hydroxides, silica gel, activated clay, fuller's earth, and the like. In the case of crude sugars relatively free of complex organic impurities this step may be dispensed with, while in other cases where dechlorination is unnecessary, removal of complex organic impurities may be performed and dechlorination dispensed with.

Having been thus preliminarily treated, as a succeeding step of the process of this invention, the crude sugar may next be treated for removal of water, being reduced to a state of substantial dryness. This step of the invention may be performed in any well-known manner, as by film, spray, or drum driers, or by evaporation in vacuum or pressure evaporators. The step of dewatering is carried as far as practicable and in the case of some of the crude sugars, reduction to a true solid is not feasible although a syrup of very low water content is obtainable.

The treated, crude sugar, if dried, is next incorporated with methanol or ethanol as a vehicle, or, if not dried, its water content adjusted to be appropriate as a vehicle. The sugar and vehicle are then heated and subjected to high pressures, say 1000 to 4000 pounds per sq. in., in the presence of an atmosphere of hydrogen gas and in the presence of a hydrogenation catalyst, preferably of the type which exhibits hydrogenating activity even after exposure to atmospheric oxygen, although use of the ordinary hydrogenation catalysts is also contemplated. The catalysts preferred are copper-aluminum oxide catalyst, as described in U. S. Patent No. 2,201,235, or the well-known copper-chromium oxide catalyst. Both of these catalysts are active for hydrogenation of pure substances even after prolonged exposure to the air and while this is one of their unique and distinguishing properties and the reduction and use thereof, out of contact with oxygen, has heretofore been found to result in no increase in their activity in the hydrogenation of pure substances, it is a part of the discovery of this invention that a superactivation of these catalysts, so far as crude sugars are concerned, is brought about by exclusion of oxygen in their reduction and use.

While ordinary catalysts used in performing the steps of the process of this invention as normally prepared will function on the crude raw material after the preliminary steps hereinabove described, this purification need not be so nearly complete when one of the above catalysts superactivated by reduction out of contact with oxygen is used. The copper-aluminum oxide in its reduced form is very stable in the presence of air and oxygen and normally no special precautions are necessary to protect it from air or oxygen when it is used in reactions involving the pure sugar. Copper-chromium oxide as normally prepared is not subjected to a reducing treatment prior to use with the pure sugars as a hydrogenation catalyst. We have found that the immunity to catalyst poisons in crude sugars is substantially increased if these catalysts are reduced with hydrogen at 200 to 500 degrees C., and not allowed to come into contact with air or oxygen before they are used in the hydrogenation of the crude sugar, and these catalysts so treated we refer to herein as "immunized" catalysts. We are well aware that this precaution of excluding oxygen or air from reduced catalysts is common practice in certain branches of the art of catalyst preparation, but it has heretofore been considered unnecessary in the case of the two catalysts preferred for the practice of the process of this invention. In fact, the stability toward oxygen of these catalysts has been the chief reason for their use. The chief advantage claimed for our improvement in the use of these catalysts lies in the fact that certain sugar hydrogenolysis reactions may be carried to completion with their aid that normally will take place to only a limited extent.

Specific instances of use of the process of this invention are set forth below as a guide to those skilled in the art in practicing the invention and from which those skilled in the art may recognize that the invention hereof is of such applicability that the same may be performed not only with the particular ingredients and under the particular conditions set forth in specific instances, but also with and by the employment of the reasonable equivalents thereof.

INSTANCE 1.—*Hydrogenation of hydrol*

100 parts of final hydrol (the non-crystalline residue from the production of high purity dextrose) is placed in a ball-mill with an equal weight of water (a wide range of proportions with water being suitable) and with the approximate amount of solid silver sulfate necessary to thrown down whatever precipitate may be formed thereby. The mixture is ground in the mill until the mixture forms no precipitate with further addition of soluble silver salt. The precipitate is removed by filtration and recovered for its silver content and the solution dried in a vacuum drier. The dried product is then mixed with methanol (equal parts of each being preferred but the proportions may be varied), and treated with hydrogen at 150 to 350 degrees C. (250 degrees C. being preferred), under 900 to 4000 pounds per square inch pressure (1700 to 2100 pounds per square inch being preferred), in the presence of a small amount (ten per cent being preferred) of a non-immunized copper-aluminum oxide hydrogenation catalyst and about 0.5% $Na_2CO_3$ (each based on the weight of the dried hydrol). By this method I have produced about 33.0 parts propylene glycol, 9.9 parts crude glycerine or glycerine-like substances, and 7.0 parts of a water-soluble residue, from 100 parts of the hydrol solid.

A sample of hydrol treated as above except for treatment with silver salt takes up substantially no hydrogen under similar reaction conditions.

INSTANCE 2.—*Hydrogenation of #80 sugar*

A sample of #80 sugar (an impure dextrose hydrate containing about 90% dextrose on a dry basis) is dissolved in water and preliminarily treated by the addition of the necessary amount of silver nitrate. The precipitate is removed by filtration and the solution evaporated to a syrup which crystallizes slowly. The purified material when treated with hydrogen at 150 to 350 degrees C. (preferably 250 degrees C.) under 900 pounds per square inch to 4000 pounds per square inch (preferably 1400 to 1800 pounds per square inch), in the presence of a small amount, say ten per cent of a non-immunized copper-aluminum oxide hydrogenation catalyst and a small amount, say 0.5% of $Na_2CO_3$, in methanol vehicle, gives a yield of about 32.7% propylene glycol, 20% crude glycerol or glycerine-like substances, and 11.3% of a liquid residue, whereas the original sugar, without preliminary treatment, does not react appreciably under similar reaction conditions.

INSTANCE 3.—*Hydrogenation of molasses*

A dried sample of molasses containing about 0.5% chloride as NaCl, may be partially freed of organic impurities by a carbon treatment which involves heating and stirring about 500 parts molasses in about 500 parts water with a total of about 75 parts activated carbon. Without treatment to remove chloride, the same may be hydrogenated in the presence of an immunized copper-barium-chromium oxide catalyst (that is a catalyst prepared by heating copper-barium chromite, methanol and hydrogen to say 250 degrees C. during about 2.5 hours in an autoclave under pressure). The molasses, after treatment with carbon, is reduced to substantial dryness and made into a reaction mixture composed of about 10 parts of this dried molasses, about 10 parts absolute methanol, and about 1 part immunized catalyst. The reactants may be heated and shaken for 3 to 5 hours under maximum temperatures and pressures of about 254 degrees C. and 1880 pounds per square inch. There is produced: propylene glycol, about 33%, crude glycerol or glycerine-like substances, about 29.5%, and residue about 17.9%. The same material treated with hydrogen and the non-immunized form of the same catalyst under similar conditions does not react appreciably.

INSTANCE 4.—*Hydrogenation of molasses*

A sample of high-test molasses is made chloride-free by treatment with $Ag_2SO_4$. When dried and hydrogenated in methanol with about 10% of a copper-aluminum catalyst this material gives a yield of about 5.3% propylene glycol, 19.6% crude glycerol and 33.9% of a residue non-volatile at the boiling point of glycerol. Another sample of the same molasses when additionally treated with decolorizing carbon at 100 degrees C. before removal of chloride with silver and when dried and hydrogenated under the same conditions, gives a yield of about 21.6% propylene glycol, 17.4% crude glycerol, and 26.8% of a fluid residue. It is seen that purification by treatment with an adsorptive agent allows the production of more of the desirable distillable products.

While this invention has been described in connection with specific examples thereof, it is intended that the protection of Letters Patent to be granted hereunder shall not be unnecessarily limited thereby, but that such protection shall extend to cover the invention disclosed herein as represented by the scope of the claims hereto appended.

What I claim as my invention is:

1. The method of producing hydrogenolysis products from crude sugar products which comprises mixing such sugar products with water, treating said sugar and water mixture with a dechlorinating agent, separating said crude sugar-water mixture from said dechlorinating agent and chlorine, subjecting said dechlorinated sugar-water mixture to the action of a solid adsorption agent selected from the group consisting of activated carbon, activated alumina, gelatinous hydroxides, silica gel, activated clay and fuller's earth, drying the sugar thus treated to substantial dryness, and then suspending said dried sugar in methyl alcohol as a vehicle and while so suspended treating said sugar with hydrogen at pressures between 900 and 4000 pounds per square inch at temperatures between 150 and 300 degrees C. in the presence of a hydrogenation catalyst.

2. The method of producing hydrogenolysis products from crude sugar products which comprises mixing crude sugar products with water, treating said sugar-water mixture with a dechlorinating agent, separating said sugar-water mixture from said dechlorinating agent and chlorine, drying said sugar thus treated to substantial dryness, suspending said dried solid in methyl alcohol and while so suspended treating said sugar with hydrogen at pressures between 900 and 4000 pounds per square inch at temperatures of 150 to 300 degrees C. in the presence of a hydrogenation catalyst.

3. The method of producing hydrogenolysis products from crude sugar products which comprises mixing crude sugar products with water, treating said mixture with a soluble compound of silver whereby chloride ion is precipitated as a solid, filtering to remove said solid and produce a filtrate, treating said filtrate with adsorption carbon, drying said carbon treated filtrate to yield a substantially dry crude sugar, suspending said substantially dry sugar in methyl alcohol as a vehicle, and then treating said sugar in said vehicle with hydrogen gas at pressures of 900 to 4000 pounds per square inch at temperatures of 150 to 300 degrees C. in the presence of a hydrogenation catalyst.

4. The method of producing hydrogenolysis products from raw sugar which comprises mixing raw sugar with water, subjecting said raw sugar-water mixture to the action of an activated solid adsorption agent selected from the group consisting of activated carbon, activated alumina, gelatinous hydroxides, silica gel, activated clay and fuller's earth, drying the raw sugar thus treated to substantial dryness, and then suspending said dried raw sugar in methyl alcohol as a vehicle and while so suspended treating said raw sugar with hydrogen at pressures between 900 and 4000 pounds per square inch with hydrogen at temperatures between 150 and 300 degrees C. in the presence of a hydrogenation catalyst which has been reduced and introduced into the reaction mixture without contact with substantial amounts of oxygen.

5. The method of producing hydrogenolysis products from raw sugar which comprises mixing raw sugar with water, treating said raw sugar and water mixture with a dechlorinating agent, separating said raw sugar-water mixture from said dechlorinating agent and chlorine, subjecting said raw sugar-water mixture to the action of an activated solid adsorption agent selected from the group consisting of activated carbon, activated alumina, gelatinous hydroxides, silica gel, activated clay and fuller's earth, drying the raw sugar thus treated to substantial dryness, and then suspending said dried raw sugar in methyl alcohol as a vehicle and while so suspended treating said raw sugar with hydrogen at pressures between 900 and 4000 pounds per square inch and at temperatures between 150 and 300 degrees C. in the presence of a catalyst selected from the group consisting of copper-aluminum oxide and copper-barium chromite which has been reduced and introduced into the reaction mixture without contact with substantial amounts of oxygen.

6. The method of producing hydrogenolysis products from raw sugar which comprises mixing raw sugar with water, treating said raw sugar-water mixture with a dechlorinating compound containing a metal selected from the group consisting of silver, mercurous mercury, cuprous copper, lead and thallium, drying said raw sugar thus treated to substantial dryness, suspending said dried raw sugar in methyl alcohol and while so suspended treating said raw sugar with hydrogen at pressures between 900 and 4000 pounds per square inch at temperatures of 150 to 300 degrees C. in the presence of a hydrogenation catalyst.

7. The method of producing hydrogenolysis products from hydrol which comprises mixing hydrol with water, treating said hydrol and water mixture with silver sulphate, separating said hydrol-water mixture from the precipitate formed, subjecting said hydrol-water mixture to the action of activated carbons, drying the hydrol thus treated to substantial dryness, and then suspending said dried hydrol in methyl alcohol as a vehicle and while so suspended treating said hydrol with hydrogen at pressures between 900 and 4000 pounds per square inch and at temperatures between 150 and 300 degrees C. in the presence of a catalyst selected from the group consisting of copper-aluminum oxide and copper-barium chromite.

8. The method of producing hydrogenolysis products from dried molasses containing not over about .5 of 1% chloride which comprises mixing said dried molasses with water and treating the same with activated carbon, separating said molasses-water mixture from said activated carbon, reducing said molasses to substantial dryness, suspending said molasses thus dried in methyl alcohol and while so suspended treating said dried molasses with hydrogen at pressures between 900 and 4000 pounds per square inch at temperatures of 150 to 300 degrees C. in the presence of a hydrogenation catalyst selected from the group consisting of copper-aluminum oxide and copper-barium chromite which has been reduced and introduced into the reaction mixture without contact with substantial amounts of oxygen.

9. The method of producing hydrogenolysis products from high test molasses which comprises adding silver sulphate to said molasses, removing the precipitate thus formed, reducing the molasses thus treated to substantial dryness, suspending said dried molasses in methyl alcohol and while so suspended treating said molasses with hydrogen at pressures between 900 and 4000 pounds per square inch at temperatures of 150 to 300 degrees C. in the presence of a hydrogenation catalyst selected from the group consisting of copper-aluminum oxide and copper-barium chromite.

10. The method of producing hydrogenolysis products from high test molasses which comprises treating said molasses with silver sulphate to form a precipitate, removing the precipitate thus formed, treating the molasses from which the precipitate has been removed with activated decolorizing carbon, separating the molasses from said carbon and reducing the same to substantial dryness, suspending the dried molasses thus formed in methyl alcohol and while so suspended treating said dried molasses with hydrogen at pressures between 900 and 4000 pounds per square inch at temperatures of 150 to 300 degrees C. in the presence of a hydrogenation catalyst selected from the group consisting of copper-aluminum oxide and copper-barium chromite.

11. The method of producing hydrogenolysis products from crude sugars which comprises mixing the crude sugar with water, treating said sugar-water mixture with a solid adsorbtion agent selected from the group consisting of activated carbon, activated alumina, gelatinous hydroxides, silica gel, fuller's earth and activated clay, separating said crude sugar-water mixture from said solid adsorbtion agent, and reducing said crude sugar-water mixture to substantial dryness, suspending said dried crude sugar in methyl alcohol as a vehicle and while so suspended treating said crude sugar with hydrogen at pressures between 900 and 4000 pounds per square inch at temperatures of 150 to 300 degrees C. in the presence of a hydrogenation catalyst selected from the group consisting of copper-aluminum oxide and copper-barium chromite reduced and introduced into the reaction mixture without contact with substantial amounts of oxygen.

12. The method of producing hydrogenolysis products from crude sugar products which comprises mixing such sugar products with water, treating said sugar with a dechlorinating agent, separating said sugar-water mixture from said dechlorinating agent and chlorine, and then treating said sugar with hydrogen at pressures between 900 and 4000 pounds per square inch and at temperatures between 150 and 300 degrees C. in the presence of a hydrogenation catalyst.

13. In a catalytic process for the production of hydrogenolytic products from a crude sugar product containing minor amounts of chlorides, the step which comprises removing chlorides from such material prior to subjecting such material to hydrogenolysis.

14. In a catalytic process for the production of hydrogenolytic products from high-test molasses, the step which comprises removing chlorides from said molasses prior to subjecting said molasses to hydrogenolysis.

ROBERT N. DU PUIS.